United States Patent
Katayama

(10) Patent No.: US 11,011,771 B2
(45) Date of Patent: May 18, 2021

(54) FUEL CELL VEHICLE

(71) Applicant: TOYOTA JIDOSHA KABUSHIKI KAISHA, Toyota (JP)

(72) Inventor: Masahiro Katayama, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/269,884

(22) Filed: Feb. 7, 2019

(65) Prior Publication Data
US 2019/0260057 A1  Aug. 22, 2019

(30) Foreign Application Priority Data

Feb. 20, 2018  (JP) .............................. JP2018-028024

(51) Int. Cl.
*H01M 8/2475* (2016.01)
*H01M 8/04828* (2016.01)
*B60L 50/72* (2019.01)
*B60L 58/30* (2019.01)

(52) U.S. Cl.
CPC ........... *H01M 8/2475* (2013.01); *B60L 50/72* (2019.02); *B60L 58/30* (2019.02); *H01M 8/0494* (2013.01); *H01M 2250/20* (2013.01)

(58) Field of Classification Search
CPC ............. H01M 8/2475; H01M 8/0494; H01M 2250/20
See application file for complete search history.

(56) References Cited

U.S. PATENT DOCUMENTS

| | | | |
|---|---|---|---|
| 2007/0224469 A1* | 9/2007 | Isozaki | C01B 3/326 429/412 |
| 2010/0178576 A1* | 7/2010 | Olsommer | H01M 8/0202 429/434 |
| 2016/0141640 A1* | 5/2016 | Nishiumi | H01M 8/2475 429/508 |

FOREIGN PATENT DOCUMENTS

| | | |
|---|---|---|
| JP | 2009301923 A | 12/2009 |
| JP | 2015170545 A | 9/2015 |

OTHER PUBLICATIONS

Masahiro Katayama, U.S. Appl. No. 16/195,198, filed Nov. 19, 2018, for Fuel Cell Module.

* cited by examiner

*Primary Examiner* — Osei K Amponsah

(74) *Attorney, Agent, or Firm* — Dickinson Wright PLLC

(57) ABSTRACT

A fuel cell vehicle includes: a stack case accommodating a fuel cell stack; and a PCU that is disposed to face the stack case and is coupled to the stack case via bus bars. A through-hole is formed in a top plate of the stack case facing the PCU. The PCU is also coupled and fixed to a vehicle body via a coupling member.

6 Claims, 6 Drawing Sheets

FUEL CELL VEHICLE

INCORPORATION BY REFERENCE

The disclosure of Japanese Patent Application No. 2018-028024 filed on Feb. 20, 2018 including the specification, drawings and abstract is incorporated herein by reference in its entirety.

BACKGROUND

1. Technical Field

The present disclosure relates to a fuel cell vehicle.

2. Description of Related Art

An example of a technique in such a field includes a technique described in Japanese Patent Application Publication No. 2009-301923 (JP 2009-301923 A). A fuel cell vehicle described in JP 2009-301923 A includes: a fuel cell stack; and a stack case accommodating the fuel cell stack, and an aperture of the stack case is provided with pressure reduction means to open the aperture so as to release pressure inside the stack case when the pressure becomes more than a preset value. An electric insulation member to prevent an electric shock is provided between the pressure reduction means and the fuel cell stack.

SUMMARY

Unfortunately, in the above-described fuel cell vehicle, when a vulnerable part having a lower rigidity is used as the pressure reduction means and the vulnerable part is brought to be broken so as to release the pressure, cracks caused by the breakage might run beyond the vulnerable part, to further reach a part having no electric insulation member. Thus, broken pieces caused by the breakage might scatter and cause influences on other components located near the stack case. As a method for preventing such a case, it can be considered to provide ribs and the like on whole plates of the stack case for the sake of reinforcement of the stack case, but this method rather hinders size reduction of the stack case.

The present disclosure provides a fuel cell vehicle capable of promoting size reduction of a case stack, while suppressing scattering of broken pieces.

An aspect of the present disclosure relates to a fuel cell vehicle including: a fuel cell stack; a stack case accommodating the fuel cell stack; and a heavy weight structural component disposed so as to face the stack case and coupled to the stack case via bus bars. A vulnerable part having a lower rigidity than that in the other parts of the stack case is provided in a wall plate of the stack case, the wall plate facing the heavy weight structural component.

Since the fuel cell vehicle of this aspect is provided with the vulnerable part to the wall plate of the stack case, which faces the heavy weight structural component, in the event that pressure inside the stack case is increased, the pressure inside the stack case can be released to the outside by bringing the vulnerable part to be broken. Then, broken pieces caused by the breakage collide against the opposite heavy weight structural component, thus suppressing the broken pieces from scattering to the periphery the heavy weight structural component.

At least one of the stack case and the heavy weight structural component may be further coupled to a body of the vehicle. This configuration can not only promote stability of the stack case and/or the heavy weight structural component, but also further enhance the effect to suppress scattering of the broken pieces.

The heavy weight structural component may be a power control unit. The power control unit is also utilized as a member to suppress the scattering of the broken pieces in this manner, to thereby reduce increase in number of components as well as increase in cost.

According to the present disclosure, it is possible to promote size reduction of the stack case, while suppressing scattering of broken pieces.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
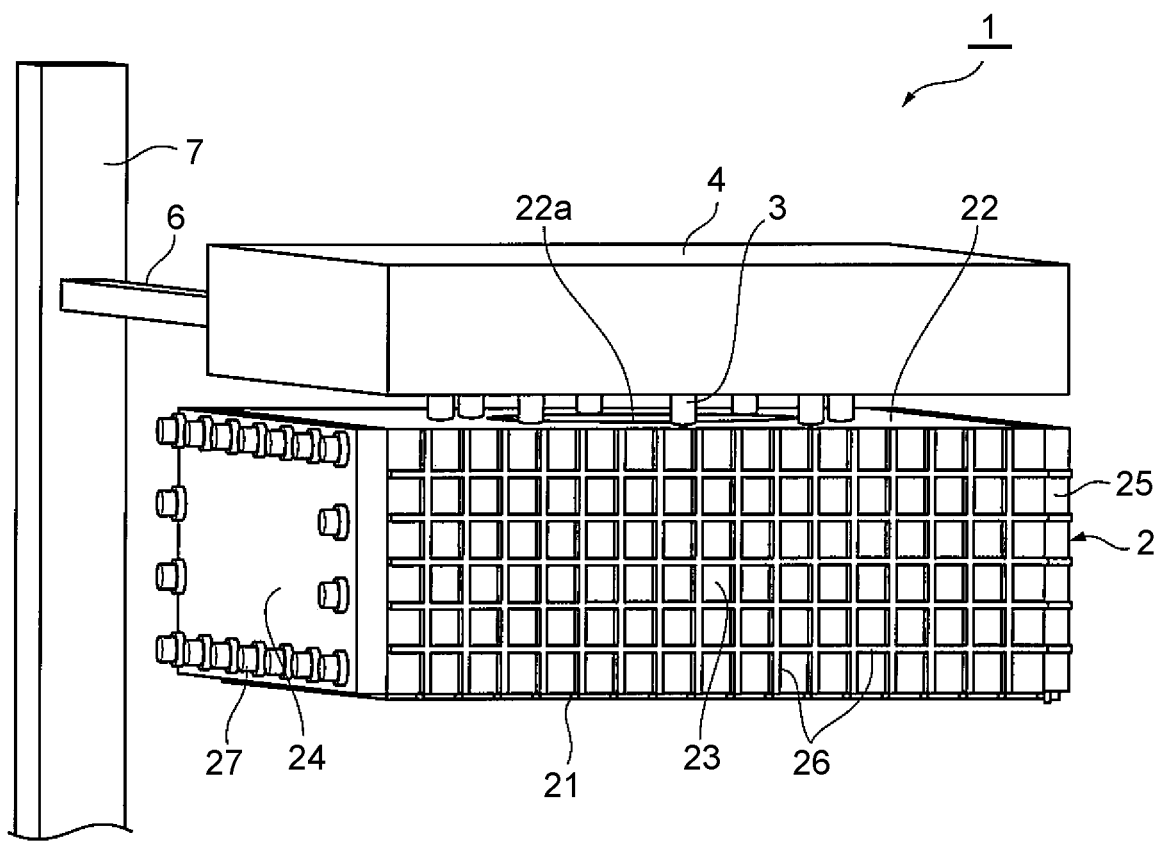
FIG. 1 is a perspective view showing a major part of a fuel cell vehicle according to a first embodiment.

Hereinafter, embodiments of a fuel cell vehicle according to the present disclosure will be described with reference to the drawings. The same reference numerals will be added to the same component elements in the description of the drawings, and duplicate description thereof will be omitted.

First Embodiment

Figure 2:
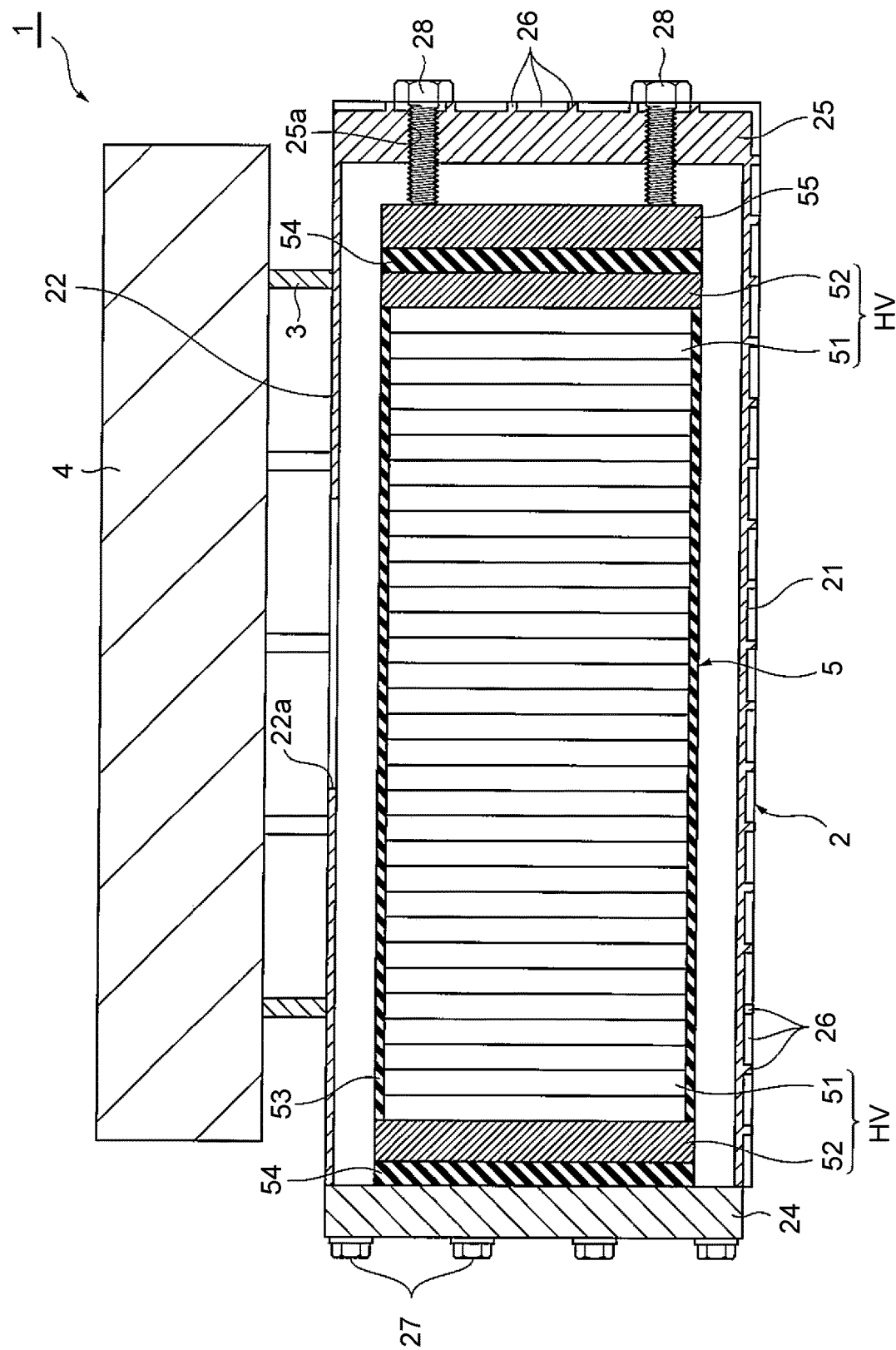
FIG. 2 is a sectional view showing the major part of the fuel cell vehicle according to the first embodiment.

FIG. 1 is a perspective view showing a major part of the fuel cell vehicle according to the first embodiment, and FIG. 2 is a sectional view showing the major part of the fuel cell vehicle according to the first embodiment. The fuel cell vehicle 1 of the present embodiment mainly includes: a stack case 2 installed in a front room of the vehicle and accommodating a fuel cell stack 5; and a power control unit (hereinafter, referred to as a PCU) 4 coupled to the stack case 2 via a plurality of bus bars 3.

As shown in FIG. 2, the fuel cell stack 5 is configured by stacking a plurality of fuel cells 51. Terminal plates 52 are disposed at respective both ends in the stacking direction of the fuel cells 51. The terminal plates 52 have a structure to be connected to the fuel cells 51 at both ends in the stacking direction of the fuel cells 51 so as to take out electric power generated by the fuel cells 51.

The fuel cells 51, and the terminal plates 52 disposed at the both ends of the fuel cell stack 5 serve as high-voltage parts HV that have a higher voltage than that of the other parts during power generation by the fuel cell stack 5. The fuel cell stack 5 includes electric insulation sheets 53 and electric insulation plates 54 that are disposed between the stack case 2 and the high-voltage parts HV.

The electric insulation sheets 53 and the electric insulation plates 54 are each formed by a resin material or the like having an electric insulation property. The electric insulation sheets 53 are disposed between the fuel cells 51 and the stack case 2 in such a manner as to cover the fuel cell stack 5 along the stacking direction of the fuel cells 51. On the other hand, the electric insulation plates 54 are disposed respectively between the terminal plate 52 and the stack case 2 and between the terminal plate 52 and a pressurizing plate 55. The pressurizing plate 55 has a structure to pressurize the fuel cells 51 in their stacking direction.

The stack case 2 is formed by a metallic material such as aluminum, for example, and has a rectangular box-like shape. More specifically, the stack case 2 includes: a rectangular cylindrical body formed by a bottom plate 21, a top plate 22, and a pair of lateral plates 23, 23; and a pair of end plates 24, 25 so disposed as to seal the rectangular cylindrical body.

The bottom plate 21, the top plate 22, and the lateral plates 23, 23 configure respective wall plates of the stack case 2. Among these wall plates, outer plates of the bottom plate 21 and the lateral plates 23, 23 are provided with a plurality of reinforcing ribs 26 projecting outward. As shown in FIG. 1, the reinforcing ribs 26 are formed in a grid arrayed longitudinally and laterally throughout the whole outer plates of the bottom plate 21 and the lateral plates 23, 23.

To the contrary, the top plate 22 is provided with no reinforcing ribs 26. A circular through-hole 22a through which cables and the like for electricity supply and control of the fuel cell stack 5 are inserted is formed at a center position of the top plate 22. A space in the circular through-hole 22a is sealed by a seal which is not shown in the drawings. Namely, the seal is provided between the cables and the like and a portion of top plate 22 which defines the circular through-hole 22a. The top plate 22 has a lower rigidity than that in the other parts of the stack case 2 because the top plate 22 has no reinforcing ribs but has the through-hole 22a. That is, the top plate 22 can be considered as a "vulnerable part" of the present disclosure.

The end plates 24, 25 are formed to be thicker than the bottom plate 21, the top plate 22, and the lateral plates 23, 23. Of the end plates 24, 25, the end plate 24 is a cover for sealing one opening end of the rectangular cylindrical body of the stack case 2, and is fastened and fixed to the stack case 2 with a plurality of bolts 27. On the other hand, the end plate 25 is formed to be integral with the bottom plate 21, the top plate 22, and the lateral plates 23, 23 in such a manner as to seal the other opening end of the rectangular cylindrical body of the stack case 2. The reinforcing ribs 26 arrayed in a grid are provided on the outer plate of the end plate 25.

In addition, the end plate 25 is formed with a plurality of screw holes 25a into which adjustment bolts 28 for adjusting the position of the pressurizing plate 55 are screwed. By fastening the adjustment bolts 28 screwed into the screw holes 25a of the end plate 25, the fuel cell stack 5 can be pressurized in the stacking direction of the fuel cells 51.

The PCU 4 is a component for controlling an operation status of the fuel cell stack 5 or the like, and can be considered as a "heavy weight structural component" of the present disclosure. This PCU 4 is located above the stack case 2, and disposed so as to face the top plate 22 of the stack case 2. When seen from above, the PCU 4 is preferably arranged such that the through-hole 22a of the top plate 22 is located within a range of the PCU 4. As shown in FIG. 1, the PCU 4 is further coupled and fixed to a metallic vehicle body 7 via a coupling member 6. The coupling member 6 is a metallic bracket or the like used for fixing the PCU 4 to the vehicle body 7, for example.

The plurality of (eight in the present embodiment) bus bars 3 are arranged in such a manner as to surround the through-hole 22a of the top plate 22 with equal intervals. Each bus bar 3 is formed in a columnar shape by a metallic material, and one end thereof is fixed to the top plate 22 of the stack case 2 and the other end thereof is fixed to a bottom part of the PCU 4 through welding or the like.

In the fuel cell vehicle 1 configured in this manner, since the top plate 22 of the stack case 2, which faces the PCU 4, is provided with no reinforcing ribs 26 but with the through-hole 22a, the top plate 22 serves as the vulnerable part having a lower rigidity than that in the other parts of the stack case 2. With this configuration, in the event that pressure becomes increased due to accumulation and the like of hydrogen inside the stack case 2, the top plate 22 can be brought to be broken to release the pressure inside the stack case 2 to the outside. At this time, broken pieces of the stack case 2 generated by this brakeage collide against the PCU 4 facing the stack case 2, to thereby suppress scattering of the broken pieces to the periphery by the PCU 4. That is, in the present embodiment, it is possible to prevent scattering of the broken pieces utilizing the inertial weight of the PCU 4. Since the scattering of the broken pieces can be prevented by utilizing the inertial weight of the PCU 4 in this manner, it is possible to eliminate necessity for providing a reinforcing member such as ribs on the top plate 22 (wall plate), thus promoting size reduction of the stack case 2.

In the event that the top plate 22 is broken, the PCU 4 facing the top plate 22 prevents the high-voltage parts HV of the fuel cell stack 5 from being exposed to the outside, to thereby prevent an electric shock due to the exposure of the high-voltage parts HV, thus maintaining safety. In addition, by utilizing the PCU 4 as a member for suppressing the scattering of the broken pieces in the above manner, it can be expected to reduce increase in number of components and increase in cost.

Furthermore, since the PCU 4 is coupled and fixed to the vehicle body 7 via the coupling member 6, by distributing the weight of the PCU 4 to the vehicle body 7, it is possible to enhance stability of not only the PCU 4 but also the stack case 2, while securing durability strength thereof during the vehicle traveling. Moreover, with this configuration, the inertial weight of the vehicle body 7 is applied via the coupling member 6 to the PCU 4, which can further enhance the effect to suppress the scattering of the broken pieces.

Second Embodiment

Figure 3:
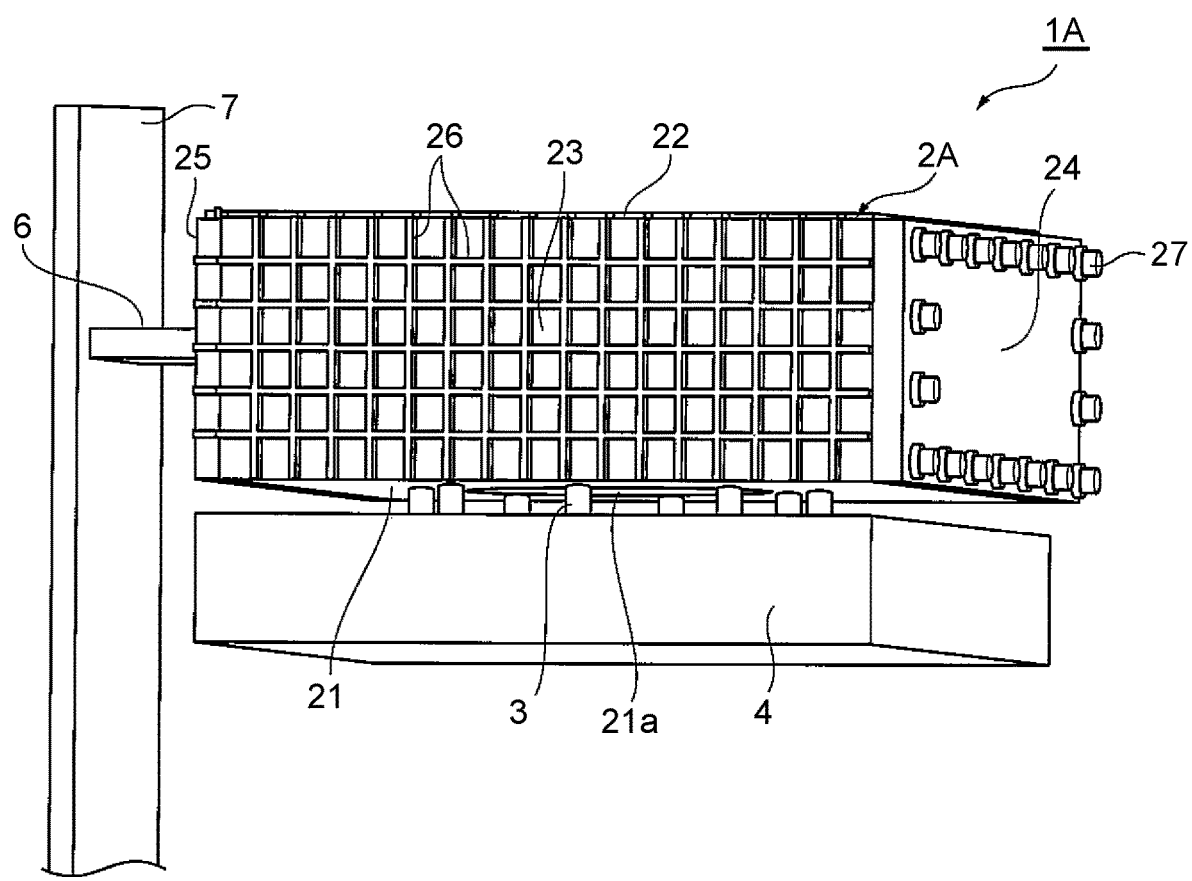
FIG. 3 is a perspective view showing a major part of a fuel cell vehicle according to a second embodiment.

FIG. 3 is a perspective view showing a major part of a fuel cell vehicle according to the second embodiment. The fuel cell vehicle 1A of the present embodiment is different from the fuel cell vehicle of the first embodiment in arrangement positions of a stack case 2A and the PCU 4, and the other structures are the same as those of the first embodiment.

Specifically, the PCU 4 is located below the stack case 2A, and is disposed to face the bottom plate 21 of the stack case 2A. Among the bottom plate 21, the top plate 22, and the lateral plates 23, 23, those plates excluding the bottom plate 21 are provided with the reinforcing ribs 26 arrayed in a grid.

The bottom plate 21 includes, at its center position, a circular through-hole 21a through which the cables and the like for electricity supply and control of the fuel cell stack 5 are inserted. The bottom plate 21 has a lower rigidity than that in the other parts of the stack case 2A because the bottom plate 21 has no reinforcing ribs but has the through-hole 21a. That is, the bottom plate 21 can be considered as a "vulnerable part" of the present disclosure. The stack case 2A is coupled and fixed to the vehicle body 7 via the coupling member 6, but the PCU 4 is not coupled and fixed to the vehicle body 7.

According to the fuel cell vehicle 1A of the present embodiment, not only the same operation and effect as those of the above first embodiment can be attained, but also flexibility of installation of the stack case 2A and the PCU 4 can be enhanced by disposing the PCU 4 below the stack case 2A, and the empty weight of the stack case 2A can also be utilized as the inertial weight.

Third Embodiment

Figure 4:
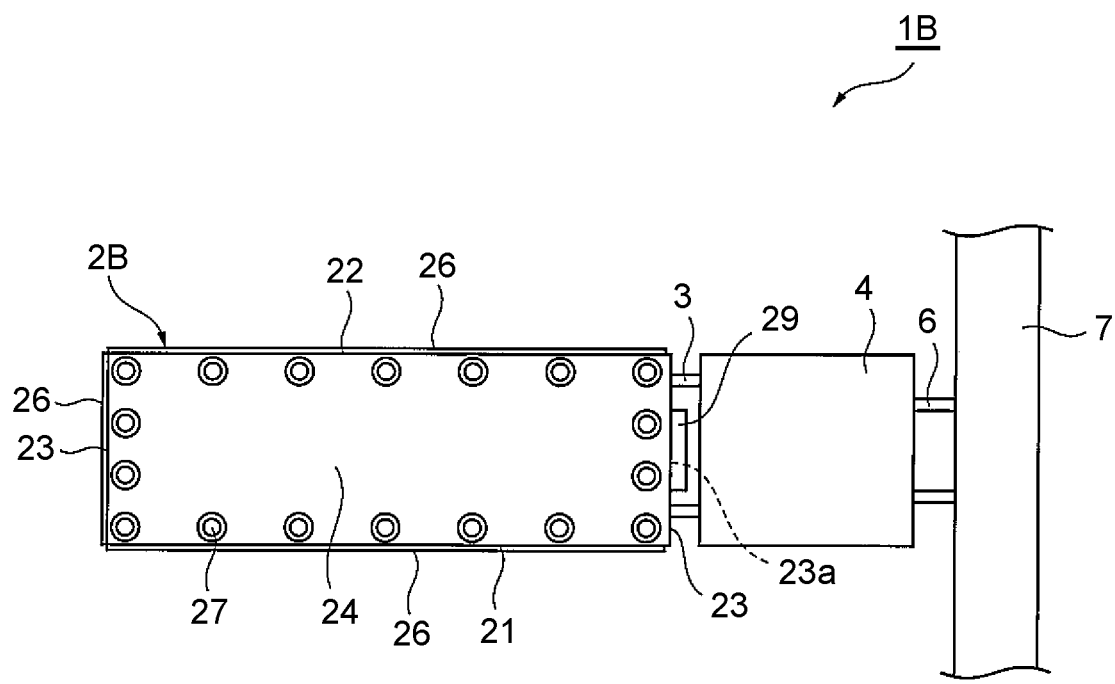
FIG. 4 is a front view showing a major part of a fuel cell vehicle according to a third embodiment.
Figure 5:
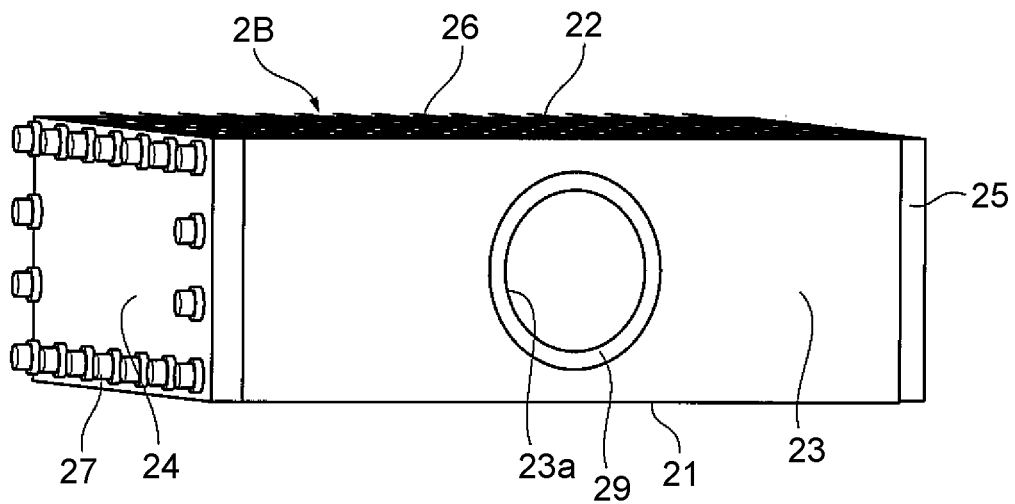
FIG. 5 is a perspective view showing a stack case of the third embodiment.

FIG. 4 is a front view showing a major part of a fuel cell vehicle according to the third embodiment, and FIG. 5 is a perspective view showing a stack case of the third embodiment. The fuel cell vehicle 1B of the present embodiment is different from the fuel cell vehicle of the first embodiment in arrangement positions of a stack case 2B and the PCU 4, and the other structures are the same as those of the first embodiment.

Specifically, the PCU 4 is disposed at a lateral positon to the stack case 2B (on the right side of the stack case 2B in FIG. 4) so as to face the right lateral plate 23 of the stack case 2B. Among the bottom plate 21, the top plate 22, and the lateral plates 23, 23, those plates excluding the right lateral plate 23 are provided with the reinforcing ribs 26 arrayed in a grid.

As shown in FIG. 5, the right lateral plate 23 includes, at its center position, a circular through-hole 23a through which the cables and the like for electricity supply and control of the fuel cell stack 5 are inserted. A surrounding wall portion 29 in an annular shape is provided on the right lateral plate 23 so as to surround the through-hole 23a. The right lateral plate 23 has a lower rigidity than that in the other parts of the stack case 2B because the right lateral plate 23 is provided with no reinforcing ribs but has the through-hole 23a. That is, in the present embodiment, the right lateral plate 23 can be considered as the "vulnerable part" of the present disclosure. The PCU 4 is coupled and fixed to the vehicle body 7 via the coupling member 6.

According to the fuel cell vehicle 1B of the present embodiment, not only the same operation and effect as those of the above first embodiment can be attained, but also flexibility of installation of the stack case 2B and the PCU 4 can be enhanced by providing the PCU 4 at the lateral position to the stack case 2B, and the empty weight of the stack case 2B can also be utilized as the inertial weight. Note that it is not always necessary to provide the surrounding wall portion 29 of the present embodiment, and thus the surrounding wall portion 29 may be omitted if necessary.

Fourth Embodiment

Figure 6:
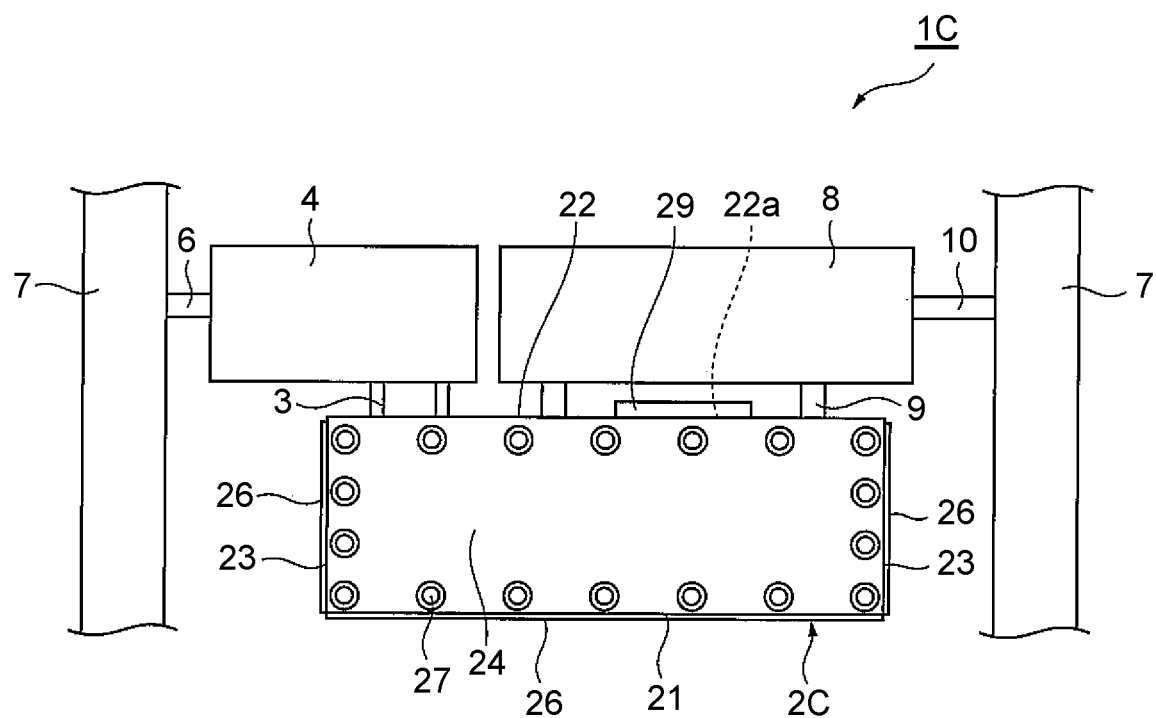
FIG. 6 is a front view showing a major part of a fuel cell vehicle according to a fourth embodiment.

FIG. 6 is a front view showing a major part of a fuel cell vehicle according to the fourth embodiment. The fuel cell vehicle 1C of the present embodiment is different from the fuel cell vehicle of the first embodiment in that the fuel cell vehicle 1C further includes, in addition to the PCU 4, a heavy weight structural component 8 which is a different component from the PCU 4, and the other structures are the same as those of the first embodiment.

Specifically, the heavy weight structural component 8 is so disposed as to face the top plate 22 of the stack case 2C, and is coupled to the stack case 2C via a plurality of bus bars 9. An example of the heavy weight structural component 8 may include auxiliary equipment having a certain amount of weight, such as an air compressor, a hydrogen pump, a water pump, and a heater for heating water, for example.

As shown in FIG. 6, the surrounding wall portion 29 surrounding the through-hole 22a is provided on the top plate 22 of the stack case 2C. In addition, when seen from above, the heavy weight structural component 8 is arranged such that the through-hole 22a of the top plate 22 is located within a range of the heavy weight structural component 8. This heavy weight structural component 8 is coupled and fixed to the vehicle body 7 via a coupling member 10.

According to the fuel cell vehicle 1C of the present embodiment, not only the same operation and effect as those of the above first embodiment can be attained, but also the heavy weight structural component 8 in addition to the PCU 4 can be further utilized as the inertial weight because the heavy weight structural component 8 different from the PCU 4 is disposed to face the stack case 2C; therefore, it is possible to further enhance the effect to suppress the scattering of the broken pieces. With this configuration, it is possible to enhance flexibility of installation of the stack case 2C, the PCU 4, and the heavy weight structural component 8.

Figure 7:
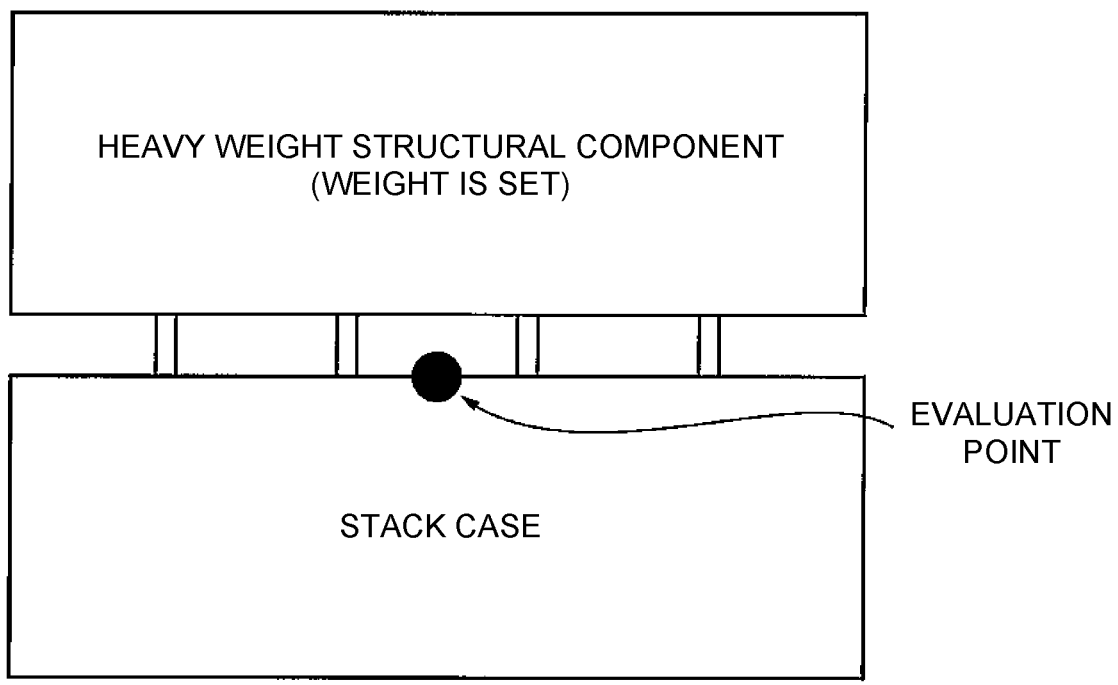
FIG. 7 is a schematic diagram showing an analytical model.

The inventor of the present application produced a model (see FIG. 7) based on the major part of the fuel cell vehicle according to the first embodiment, and also conducted an evaluation analysis in an abnormal situation under various conditions shown in Table 1. The abnormal situation referred to herein denotes a situation assuming the event that the top plate is broken due to increase in internal pressure inside the stack case. In addition, the evaluation analysis in the abnormal situation was conducted by simply calculating a relationship between the heavy weight structural component and a reduction percentage of scattering of broken pieces.

The analyzing method that was used is FEM (finite element method) acoustic analysis, and time and pressure (experiment values) were input. Amount of evaluation is a strain value at the center position (see a black dot in FIG. 7) in the top plate of the stack case facing the heavy weight structural component.

TABLE 1

| | Multiplying factor of heavy weight structural component | | | | |
|---|---|---|---|---|---|
| | 1 | 50 | 100 | 150 | 200 |
| Strain value (µε) | 651 | 567 | 473 | 384 | 295 |
| Reduction percentage (%) | 0 (Reference) | 13 | 27 | 41 | 55 |

Results of the analysis are shown in Table 1. Each of respective multiplying factors of the heavy weight structural component shown in Table 1 represents a weight multiple of the heavy weight structural component relative to a cover weight of the top plate of the stack case facing this heavy weight structural component. Each reduction percentage represents a percentage of suppression of a strain value of interest relative to the multiplying factor of 1× of the heavy weight structural component.

As a determination reference, it is determined that as the strain value is smaller, the result is better. Based on the results of the analysis shown in Table 1, it is found that an effective reduction percentage (10% or more) can be obtained from a weight having a multiplying factor of not less than 50 times the top plate weight (a sum of the vehicle body and the heavy weight structural component).

As aforementioned, the embodiments of the present disclosure have been described in detail, but the present disclosure is not limited to the above-described embodiments, and various design modifications can be made. For instance, in the above-described embodiments, the PCU is exemplified as the heavy weight structural component; however, instead of the PCU, auxiliary equipment, such as an air compressor, a hydrogen pump, a water pump, and a heater for heating water, may be used. In the above-described embodiments, the case in which either one of the stack case and the PCU is coupled and fixed to the vehicle body 7 has been described; however, both of the stack case and the PCU may be coupled and fixed to the vehicle body 7. In this case, it is possible to further promote stability of the stack case and the PCU, which makes it easier to secure the durability strength during the vehicle traveling.

What is claimed is:

1. A fuel cell vehicle comprising:
   a fuel cell stack;
   a stack case accommodating the fuel cell stack; and
   a structural component disposed so as to face the stack case, the structural component being coupled to the stack case via bus bars, wherein the structural component is selected from the group consisting of a power control unit, an air compressor, a hydrogen pump, a water pump, and a heater,
   wherein a vulnerable part is provided in a wall plate of the stack case facing the structural component; wherein the wall plates of the stack case other than the wall plate facing the structural component comprise reinforcing ribs.

2. The fuel cell vehicle according to claim 1, wherein at least one of the stack case and the structural component is coupled to a body of the vehicle.

3. The fuel cell vehicle according to claim 1, wherein the structural component is a power control unit.

4. The fuel cell vehicle according to claim 1, wherein the wall plate facing the structural component does not have reinforcing ribs.

5. The fuel cell vehicle according to claim 1, wherein the structural component is located below the stack case.

6. The fuel cell vehicle according to claim 1, wherein the reinforcing ribs are formed in a grid shape.

* * * * *